United States Patent [19]

Baxter et al.

[11] Patent Number: 5,619,306
[45] Date of Patent: Apr. 8, 1997

[54] APPARATUS FOR DUPLICATING X-RAY TYPE PHOTOGRAPHIC FILMS

[76] Inventors: Duane W. Baxter, 2212 5th Ave. SW., Rochester, Minn. 55902; Donald J. Wanek, 1843 26th St.; Arthur Hamburgen, 1330 20th St. NW., both of Rochester, Minn. 55901

[21] Appl. No.: 359,043

[22] Filed: Dec. 19, 1994

[51] Int. Cl.⁶ .................................................. G03B 27/04
[52] U.S. Cl. ................................................ 355/97; 355/84
[58] Field of Search ................................. 355/67, 83, 84, 355/103, 97, 99

[56] References Cited

U.S. PATENT DOCUMENTS

| | | | |
|---|---|---|---|
| 3,953,125 | 4/1976 | Bost | 355/83 |
| 4,891,664 | 1/1990 | Kanai | 355/67 |
| 4,926,215 | 5/1990 | Rank, Jr. | 355/99 |
| 5,073,792 | 12/1991 | Paccagnella | 355/103 X |

*Primary Examiner*—Joan H. Pendegrass
*Attorney, Agent, or Firm*—Robert W. Lahtinen

[57] ABSTRACT

Photographic films, such as X-rays, are duplicated by exposing an unexposed copy film in the presence of an intimately overlying developed film to be copied. The device exposure station has a pair of rollers at the entrance to drive the film pair and to remove from the interface between the films trapped air that would compromise the accuracy of resolution and contrast of the copy. Another pair of rollers at the outlet from the exposure station cooperates with the roller pair at the exposure station inlet to maintain the film pair within the exposure station in a planar orientation to avoid curvature which is another principal source of compromised resolution in film copies. The source of illumination for copy film exposure is, preferably, a fluorescent tube that generates emissions that are approximately matched to the wave length response of the unexposed copy film and has a length such that each end is disposed beyond the portion of the exposure station confronting a film pair so that only the tube portion intermediate the heating elements at the tube ends, where emission is most uniform, confronts the film being exposed. The film pair is driven through the apparatus by a stepper motor controlled by a microprocessor which enables the average film pair speed (and thus the exposure time) to be selected from a range of incremented values contained in an addressable controller memory location. The sequence of incremented step rate values can be changed by addressing another addressable block of values in the controller memory.

12 Claims, 6 Drawing Sheets

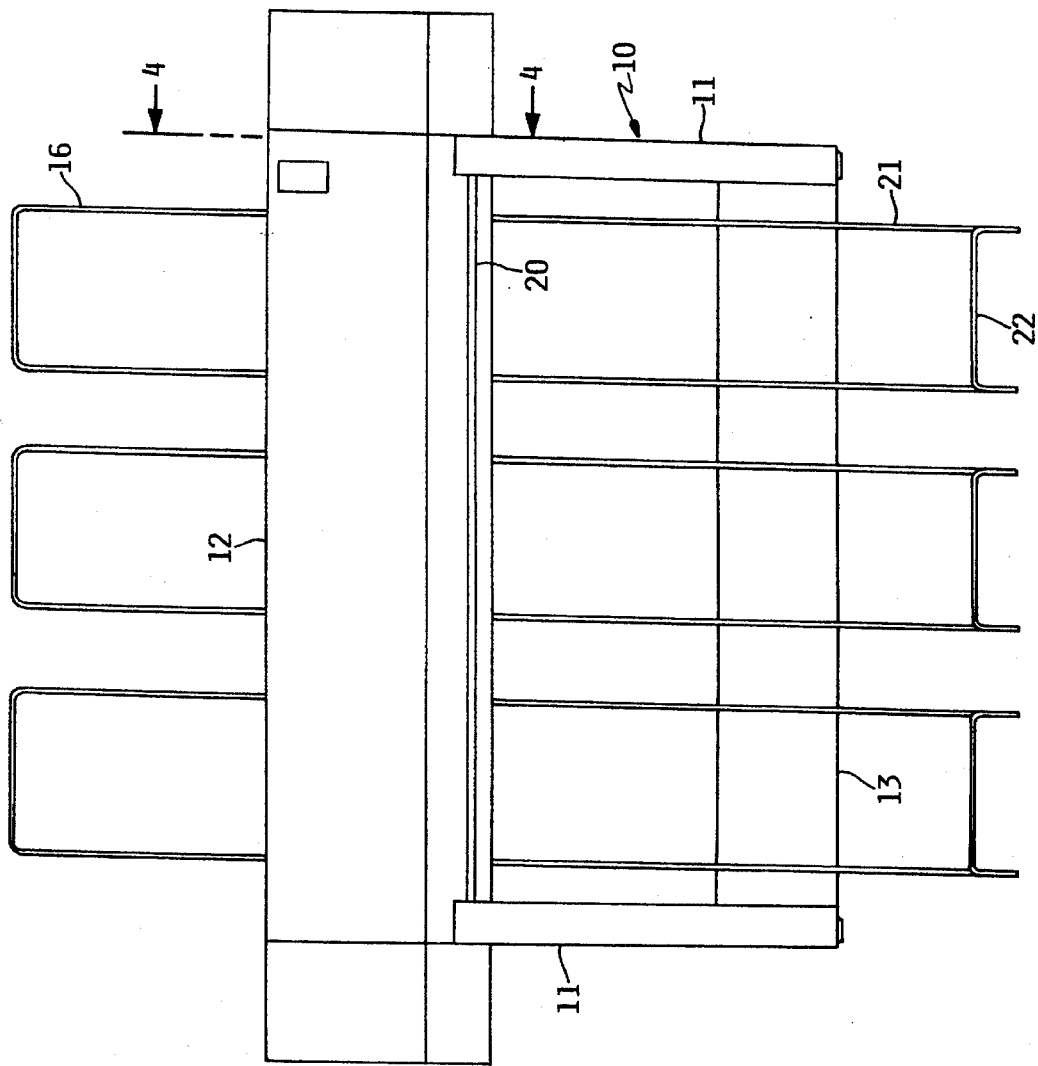
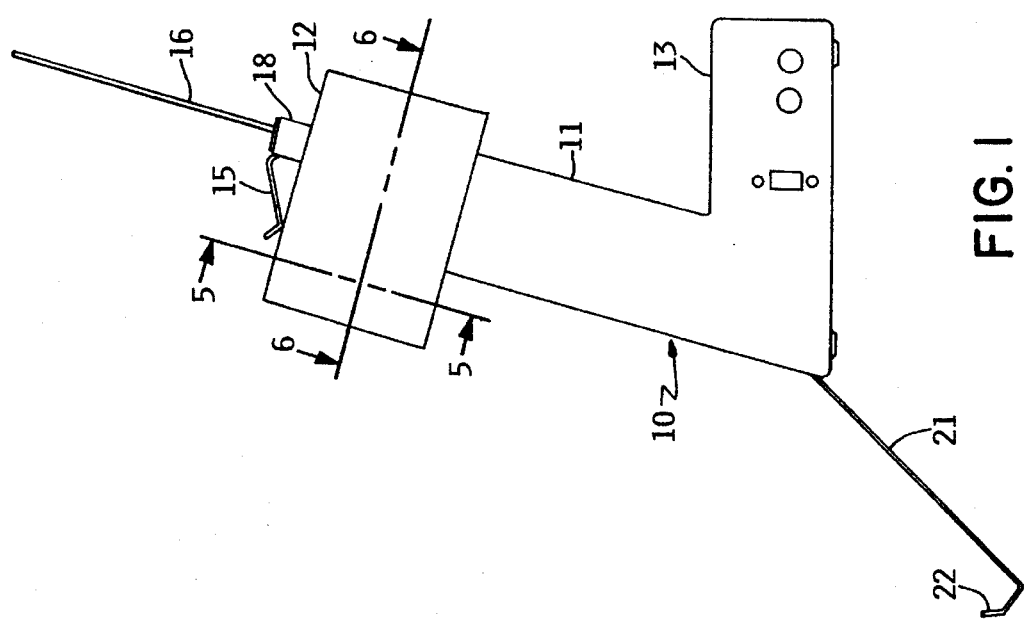

5,619,306

APPARATUS FOR DUPLICATING X-RAY TYPE PHOTOGRAPHIC FILMS

FIELD OF THE INVENTION

This invention relates to copiers and more particularly to photographic film copiers such as copying devices for duplicating medical X-rays films.

BACKGROUND OF THE INVENTION

X-ray film copying is required to provide duplicate information and documentation to various entities. Accurate copies, with definition and resolution of substantially the same quality as the original, are particularly sought in the environment of medical X-rays, which may be required for making many of the most critical decisions. Prior art X-ray copying devices have produced copies with reduced resolution either because of air trapped between the original film and the copy film during exposure or the occurrence of creep between the original and copy films during exposure.

The copying of photographic films is performed in a darkroom environment. One form of photographic films are X-rays, with medical X-rays representing the greatest volume, both with respect to the number of X-rays generated and the need for multiple copies. The copying of X-ray films is usually accomplished using a "black light" fluorescent tube emission source which emits a high concentration of short wave length ultraviolet radiation for exposing the copy film roughly matching the spectral responses of the illuminator and film. In one copying technique the original and copy films are pressed against a glass plate and either the plate is moved past a stationary light source or the light is moved to expose the copy film retained against the stationary plate, resembling flat bed plain paper document office copiers. However, this technique causes air to be trapped between the films and pressing the films between two flat surfaces causes the trapped air to be compressed rather than being expunged from the interface between the films. These small pockets of air remain to cause distortion and diminished resolution of the copy of the X-ray film.

Another technique used to copy X-ray films is to wrap the developed film original and the overlying undeveloped film on a transparent drum using a belt that partially wraps about the drum to retain the films in intimate contact as the copy is exposed, using a light source disposed within the drum. Although this method is better adapted to urge trapped air from the interface between the films, the manner in which films are usually wrapped about the drum periphery causes creep between the films as the undeveloped film is disposed at a slightly greater radius as the pair of films is curved over the drum. The relative movement between films is material, causing significant diminution of the resolution of the copied image with the impairment increasing with the length of the document being copied. Even if relative movement were eliminated, the difference in radii during exposure would cause some distortion.

SUMMARY OF THE INVENTION

In the copier described, that incorporates the concepts of the present invention, the original film and the undeveloped film used to reproduce the image are passed through the exposure station using a drive roll, pressure roll combination which not only controls the exposure of the undeveloped film, but also affords a more effective means of removing air from the interface between the films as the line contact between the rollers progressively squeezes air from between the films. Further, the document guides, the inlet roller pair including the drive roll, and the outlet roller pair including the driven roll are aligned to maintain a planar orientation of the films approaching and passing through the exposure station, avoiding resolution reducing creep and distortion between the films.

Another problem encountered in prior art devices is the occurrence of regions of varying exposure across the width of the copy film caused by light intensity variations at the ends of the exposure station resulting in an inexact developed copy. In the structure shown, a fluorescent tube light source is used which extends significantly beyond both ends of the exposure station. With the tube end portions shrouded and only the substantially uniform light intensity central portion utilized, a corresponding uniformity of film exposure is attained.

A further novel aspect of the design of the present invention is the use of a stepper motor that is directly connected to the drive roll to control film motion through the exposure station. Not only is there an absence of belts or the equivalent drive elements that can wear or stretch, but also the stepper motor enables wide flexibility in providing speed control (and thus control of film exposure). Any desired indexed sequence of roll velocity values can be provided to accommodate the requirements or convenience of the operator or to match the characteristics of the copier film or the original film being used. Under microprocessor control the sequence of electable speeds can be linear or can be logarithmic or can follow any desired curve or may be a combination of sequences in various ranges of the control. It is only necessary to change the control module that establishes the step rate at the various control sequence settings. In practice it is common to provide a switching device that enables the election of any of many control sequences or curves without making any electronic alterations.

BRIEF DESCRIPTION OF THE DRAWINGS

FIG. 1 is a side elevation of a photographic film copier incorporating the present invention with the front of the copier at the left. FIG. 2 is a front elevation of the device of FIG. 1.

DETAILED DESCRIPTION

Figure 3:
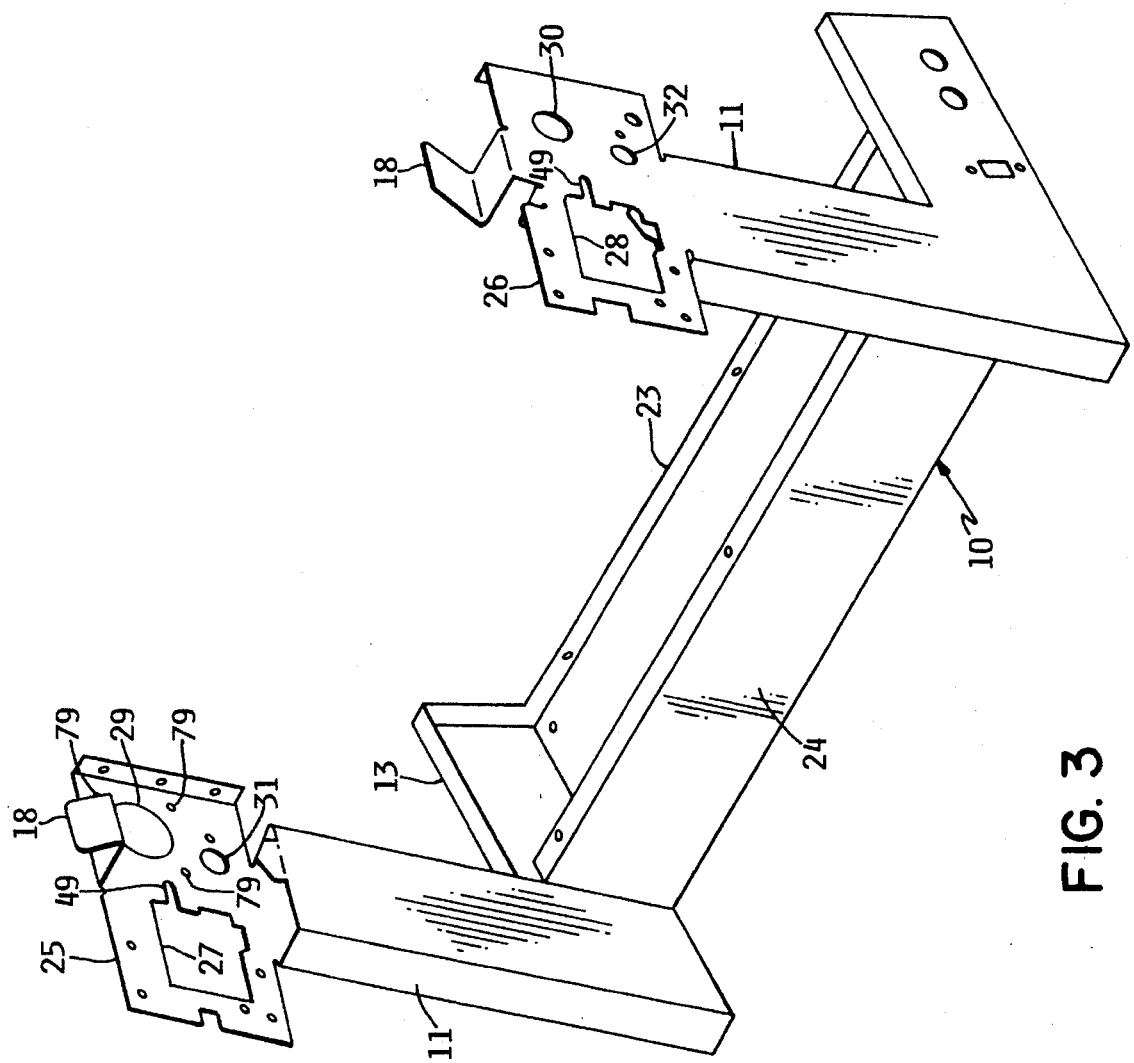
FIG. 3 is an isometric view of the frame structure of the device of FIGS. 1 and 2.

The film copier of the present invention is shown in the right side and front elevations of FIGS. 1 and 2, respectively. A frame assembly 10 includes a pair of tubular portions 11 of rectangular cross section which support an upper enclosure 12 that provides a light-tight enclosure of the exposure station and the film drive elements and a lower enclosure portion 13 that partially encloses the principal electronic control components. The unexposed copy film and the overlying developed film to be duplicated are inserted between the throat guide 15 and the support guide 16 and are further confined between the end guides 18. The original developed film and the exposed copy film emerge from a slotted opening in the lower wall between a pair of lower cover seals 20 (one of which is seen in FIG. 2) and are directed and stacked along the lower stacker guides 21. Copies of any length films can be made by the device within the width constraint defined by the guides 18. If the film length exceeds that of stacker guides 21, it is only necessary to avoid capture of the emerging films by the terminal turned portions 22 of the stacker guides 21 and receive and support the films without impairing the controlled velocity of the combined films which are proceeding in unison through the exposure station.

The unit frame 10 is illustrated in FIG. 3. A pair of rectangular section channels 11 are connected by horizontal and inclined members, 23 and 24 respectively, which also form a portion of the lower enclosure 13 that houses the principal electronic components. The upward extensions of the tubular portions 11 terminate in the plate portions 25 and 26, formed as an integral pan of and extending above the respective tubular portions, which support and form a portion of the upper enclosure 12. The lamp assembly is mounted through the apertures 27, 28; the drive roll shafts extend through apertures 29, 30 and the driven roll shafts extend through apertures 31, 32. The terminal portions of each of plates 25 and 26 is formed as a turned tab 18 which provides the side guides at each end of the entry slot to upper enclosure 12.

Figure 4:
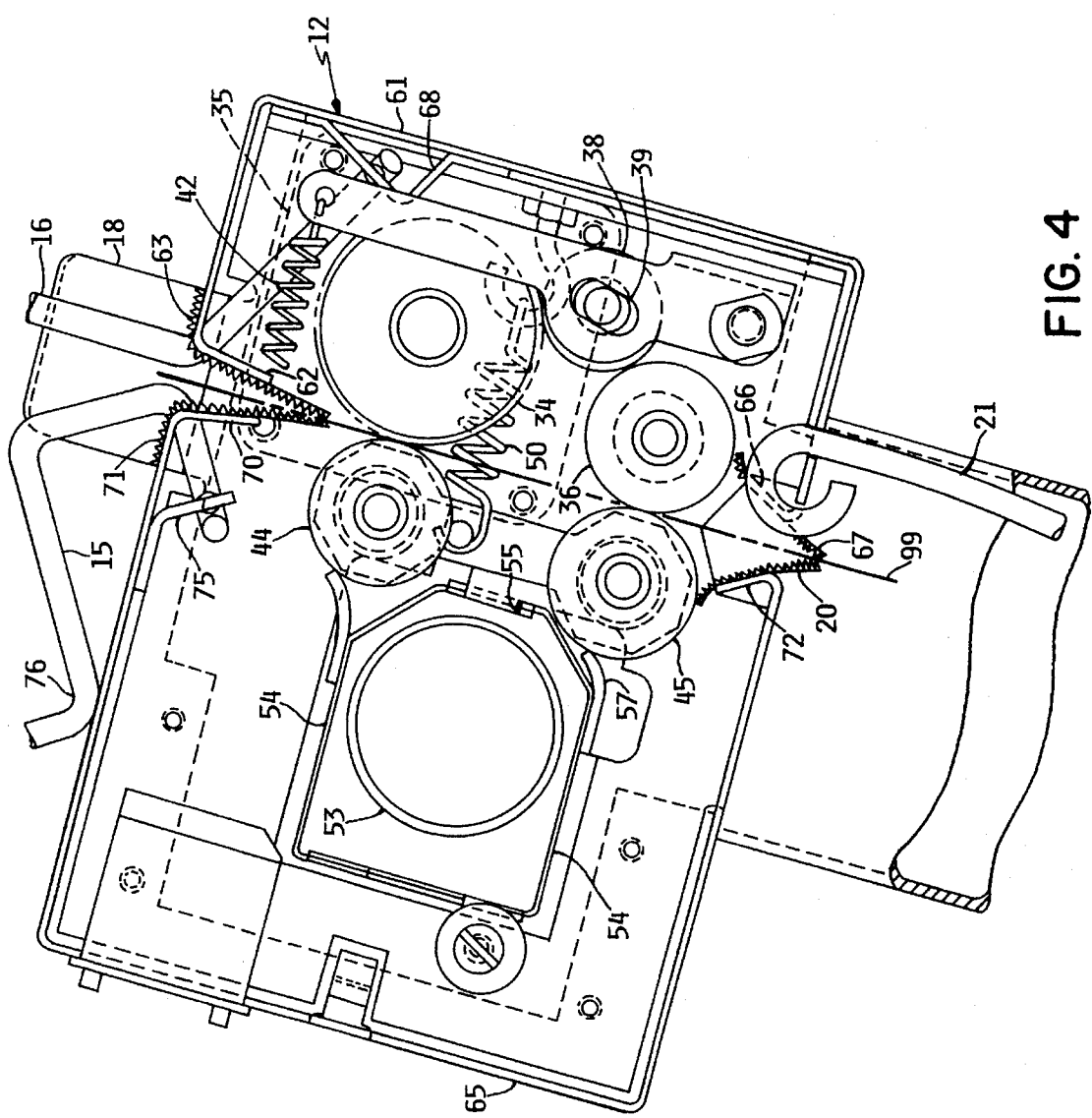
FIG. 4 is a section view taken along line 4—4 of FIG. 2 with some parts or portions thereof removed to better illustrate the operative elements and with some obscured elements shown in phantom view.
Figure 5:
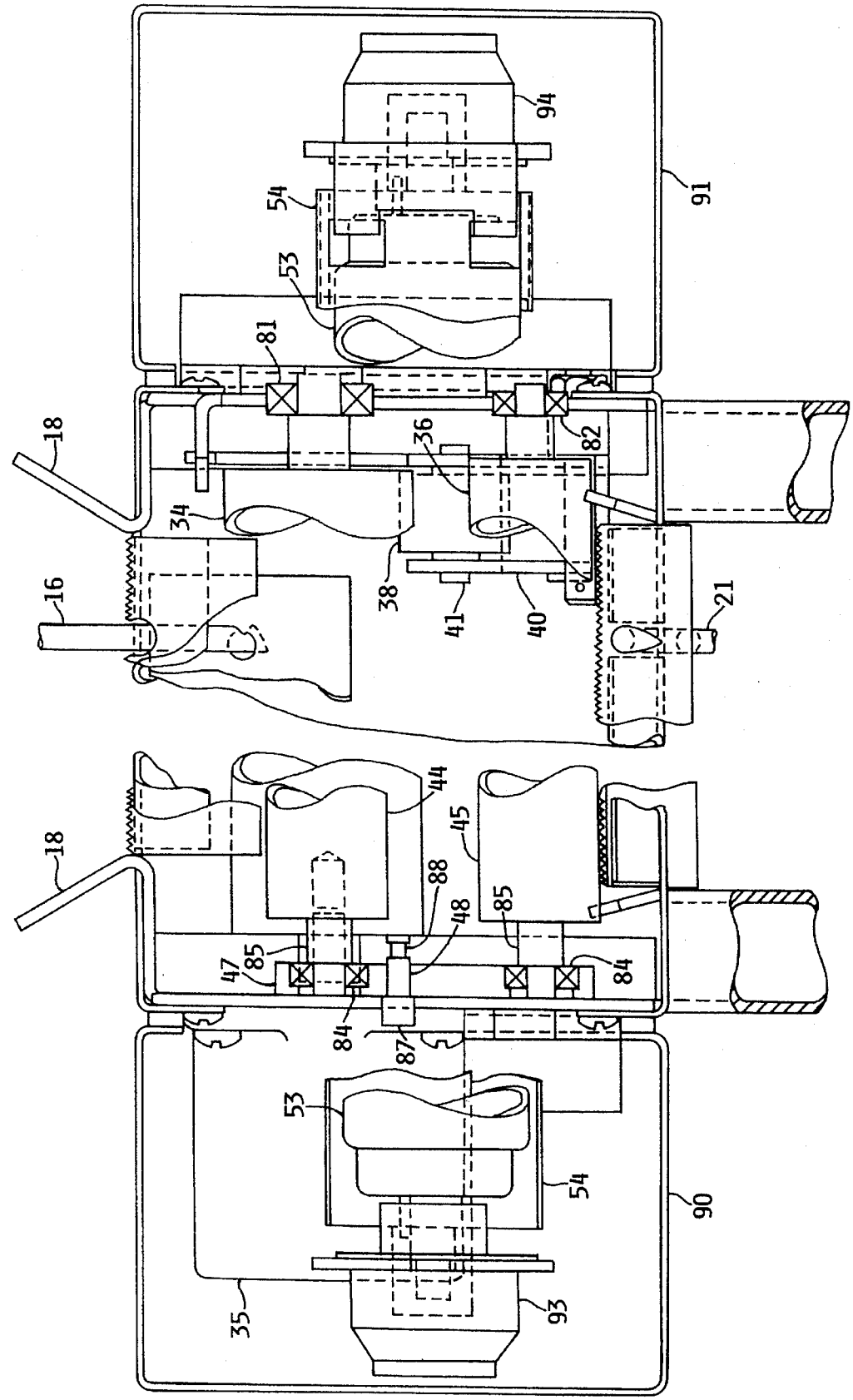
FIG. 5 is a section view along line 5—5 of FIG. 1 with the central portion removed and various parts interrupted or removed to illustrate the operative structure and some obscured parts shown in phantom view.

The details of the exposure station are shown in the views of FIGS. 4 and 5. The section view of FIG. 4 includes the elements that define the film path. The passage of the contacting film pair through the exposure station is determined by the average rotational velocity of the driving rolls. The drive roll 34 is mounted in fixed bearings at each axial end and is directly driven by a co-axial stepper motor 35. Driven roll 36 also has shaft portions at each end that are received in bearings that are supported in fixed mountings. An idler roll 38 has shafts extending from each end received in slotted openings 39 in idler bracket 40 with the idler bracket pivotable about the idler shaft 41 and biased by a spring 42 to cause rotational motion of the drive roll 34 to be transferred to the driven roll 36. A pair of pressure rolls 44, 45 cooperate respectively with drive roll 34 and driven roll 36. Both pressure rolls have end shafts received in bearing plates 47. Each of the bearing plates 47 supports both pressure rolls 44, 45 and carries a grooved slide pin 48 which is positioned in the frame end plate groove 49 (FIG. 3) to position the pressure rolls and is connected to a spring 50 to bias pressure rolls 44, 45 against drive roll 34 and driven roll 36, respectively. The light source is a fluorescent lamp or tube 53, preferably of the "black light" or "grow light" variety, that is rich in short wave length, ultraviolet radiation and which is surrounded by a pair of light shield halves 54, having overlapping back wall portions, that shroud the tube and present a slotted opening through which radiant energy is directed into the exposure station. Stray light is contained by a first wiper 57 which extends from the lower light shield half 54 into contact with pressure roll 45 and a second wiper 58 that extends from the light shield upper half 54 into contact with pressure roll 44.

A rear cover 61, in FIG. 4, has turned flange portions at each end which are secured to the plate portions 25, 26 of the frame 10 (FIG. 3). Longitudinally extending upper flange 62 cooperates to guide documents into the enclosure and has adhered thereto an upper cover seal 63 which presents a non-abrading surface that contacts documents passing through the slotted opening between covers 61 and 65. A lower turned flange 66 has a lower cover seal 67 adhered thereto. A support guide bracket 68 is welded to the inner surface of rear cover 61 and includes apertures that capture the terminal ends of support guides 16. The support guides 16 also pass through a cover aperture adjacent flanges 62 that provide support and position the guides to align documents which rest against the guides into the inlet slot between front and rear cover portions. Similarly, the stacker guides 21 are captured in apertures in a lower portion of the rear cover 61.

A front cover 65 in FIG. 4 cooperates with rear cover 61 to provide the major surfaces of upper enclosure 12 (FIG. 1). Turned flanges at each end are secured to frame plate portions 25, 26 (FIG. 3). An upper longitudinally extending flanged edge 70 has an upper cover seal 71 adhered thereto and a lower longitudinally extending flanged edge 72 has a lower cover seal 20 adhered along the flange surface. The upper cover seals 63 and 71 cooperate to contact one another or a film pair passing therebetween to seal the inlet slotted opening against light passing in either direction, while the lower cover seals 67 and 20 contact one another or a film pair passing therebetween to seal the outlet slotted opening. A throat guide bracket 75 is welded to the inner surface of front cover 65 and presents apertures in which the terminal ends of throat guides 15 are captured. Throat guides 15 pass through cover apertures adjacent longitudinally extending flange edge 70 and have turned portions 76 that rest on the outer surface of front cover 65. The turned tabs 18, formed integrally with the frame plates 25, 26 of FIG. 3 extend through enlarged slotted portions in the opening formed between the upper surfaces of front cover 65 and rear cover 61 and provide edge guides for documents entering the enclosure. Longitudinally, beyond tabs 18, the front and rear covers overlap and are welded together.

FIG. 5 shows many of the elements of FIG. 4 from a different perspective. The stepper motor 35 is mounted on frame plate 25 (FIG. 3) by bolts 78 that extend into frame openings 79 (FIG. 3). The drive roll 34 is driven directly by the output shaft 85 of stepper motor 35. Each of the drive roll 34, driven roll 36 and pressure rolls 44, 45 are formed of a polished stainless steel sleeve with end plugs that are pressed into the associated sleeve and present a projecting shaft. At the right side of the figure, drive roll 34 is supported in bearing 81 and the driven roll 36 is supported in bearing 82. Power is transferred from drive roll 34 to driven roll 36 by an idler roll 38 supported on the idler bracket 40 which pivots about idler shaft 41 and is biased by spring 42 (FIG. 4). The idler roll 38 includes a urethane outer sleeve or coating to effectively transfer rotary motion between drive and driven rolls without slippage.

Returning to the left half of the figure, the bearing plate 47 is shown with bearings 84 that receive pressure roll end shafts 85. Also shown is the slide pin 48 with an end portion 87 that slides within a frame end plate slot 49 (FIG. 3) and the grooved end 88 by which the bias spring 50 (FIG. 4) urges the pressure rolls toward the cooperating drive and driven rolls. Not shown in FIG. 5 is the similar structure including a bearing plate and biasing spring that supports and biases the opposite ends of the pressure rolls into contact with the drive and driven rolls.

The light shield, formed of the shield halves 54 (FIG. 4), is supported by the frame plates 25, 26 (FIG. 3) where the shield extends through apertures 27, 28 and into the open space within both end covers 90, 91 (FIG. 5) where the ends of the fluorescent tube are connected to lamp sockets 93 and 94. Thus, at each end, the lamp 53 extends longitudinally beyond the end of the document entry slot bounded by guide tabs 18 and into the enclosed volume within the respective end covers 90, 91. Accordingly, the end portions of the fluorescent tube 53 are shrouded beyond the operative portion of the exposure station, such that only a central portion of the tube, between the filaments at each tube end, is utilized to afford a uniform source of light emission throughout the exposure station length.

Figure 6:
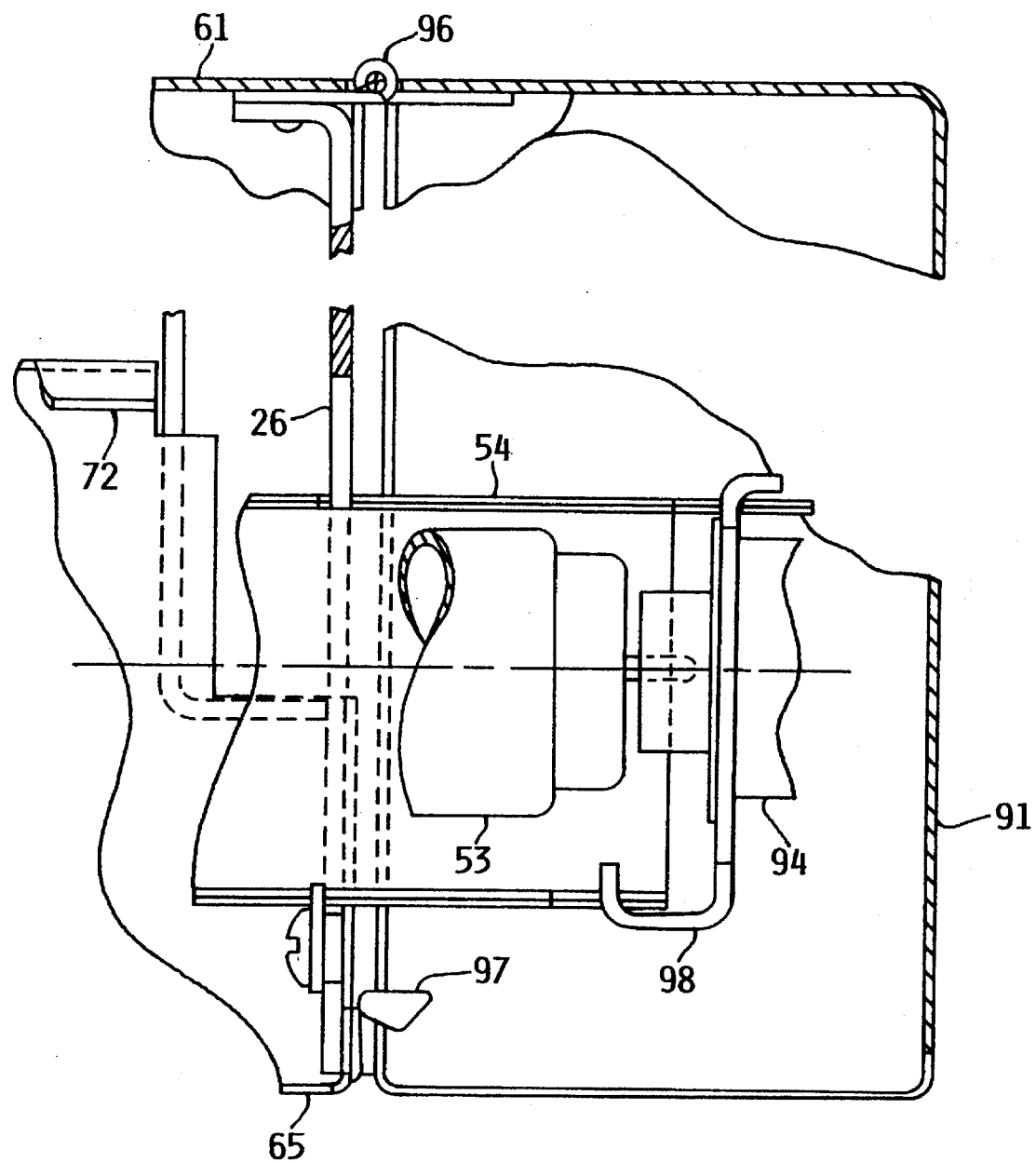
FIG. 6 is a section view along line 6—6 of FIG. 1 showing the right end cover and a portion of the adjoining enclosure with the view interrupted from front to rear.
Figure 7:
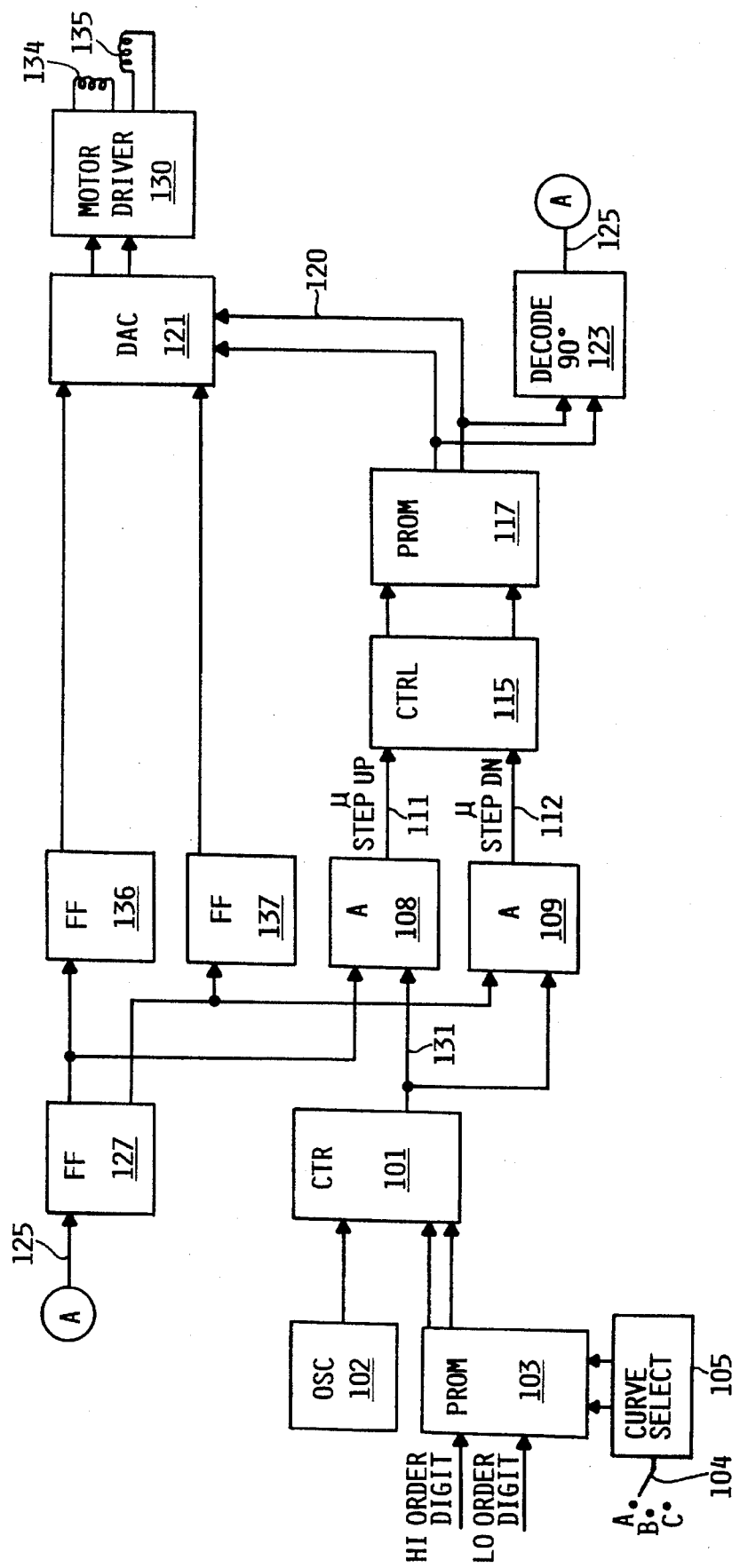
FIG. 7 is a block diagram illustrating the stepper motor drive, clock generator, and variable microstep rate control used in the photographic film copier.

FIG. 6 shows the end cover structure with a hinge 96 joining the end cover to the back cover 61 and a latch 97 that releasably retains the cover in a closed position. Also shown is the bulb socket bracket 98 that carries the socket 94 and is supported on the light shield assembly, formed of shield halves 54, through a pair of apertures Referring to FIG. 7, a clock counter 101 provides the stepper motor step rate by counting down the output from an oscillator 102 to produce a clock output 131. In the illustrated environment, a pair of push wheel switches mounted on the upper enclosure 12 each have ten positions to respectively provide the high and low order digits to identify one of one hundred stepper motor step rate settings. The hundred setting groups are stored in programmable read only memory (PROM) 103 in addressable groups of one hundred values with the group to be addressed selected by a manually settable switch 104 which, as shown, cooperates with curve select logic 105 to select among three groups. The addressable groups may be any set of step rate values, but normal procedure is to use an incremental sequence of values that follows a linear sequence for one group and a curve representing a function that applies to a particular film or environment for another. The sequence of settings within a group may also define several curves within a single group.

AND circuits 108 and 109 respectively have a microstep up output signal 111 and a microstep down signal 112 which are received by control logic 115 and transmitted to programmable read only memory (PROM) 117. These values are then loaded, via bus 120, into the digital to analog converter (DAC) 121 and the decode 90 degree logic 123, where sine and cosine functions are used to decode and identify which 90 degree quadrant is present. The output 125 of decode logic 123 is directed to a "D-type" flip-flop 127 (wherein each signal on the input data line 125 causes the output signal to change from one to the other of the set and reset modes).

Every 90 electrical degrees of motion between stepper motor poles, "D-type" flip-flop 127 and "D-type" flip-flops 136 and 137 function to switch the polarity of signals to DAC 121 and subsequently to the motor driver 130. These signals; plus the microstep up 111 and microstep down 112 signals generated using the clock signal 13 1 and AND circuits 108 and 109 and transmitted from PROM 117 to DAC 121, assure that the microstep timing will be controlled by the clock signal and provide signals to both stepper motor windings 134, 135 of the proper amplitude and sign; ie, polarity at all times.

In operation, a developed medical X-ray film to be copied and an undeveloped film onto which the image is to be copied are placed in overlying relation and inserted into the upper slot between upper cover seals 63 and 71 (FIG. 4) and guided by support guides 16 and throat guides 15. The drive roll 34 and pressure roll 44 cooperate to drive the pair of films therebetween to establish the average velocity of film pair advance and accordingly the exposure time duration of the unexposed film and further function to squeeze any entrapped air from the interface between the films as the line of contact between the rolls progresses along the length of the contacting pair of films. With the air effectively removed from the interface between the films, a major source of degradation of the copied image is eliminated. As the film progresses, it is captured between driven roll 36 and pressure roll 45 and directed to the outlet slot between cover flanges 66 and 72 and out of the device upper enclosure between the cooperating lower cover light-seals 20 and 67. As the film pair advances through the exposure station enclosed within the upper enclosure 12 along a plane indicated by the line 99, both films are maintained in a planar, intimately overlying relationship through the exposure station from entry between drive roll 34 and its pressure roll 44 to departure between the driven roll 36 and its cooperating pressure roll 45. With creep eliminated as the developed film and copy film move along a plane and in unison through the exposure station, both principal sources of degraded images are eliminated. It will also be observed that no optics are interposed between the fluorescent tube light source and the films.

While the invention has been shown and described with respect to a preferred embodiment thereof, it will be understood by those skilled in the an that changes in form and detail may be made without departing from the scope and teaching of the invention. For example the device could be rotated through an angle of less than 90 degrees to cause horizontal rather than vertical transport of film pairs through the apparatus, the drive and driven rolls could be interchanged, or the trapped air removal and illumination techniques could be applied to flat bed type copiers or the apparatus could be combined with a film processor apparatus. Accordingly, the apparatus herein disclosed is to be considered as merely illustrative, and the invention is to be limited only as specified in the claims.

What is claimed is:

1. An apparatus for making copies of developed X-ray films by exposing a pair of contacting films including a developed X-ray film to be copied and an unexposed copy film comprising an exposure station for exposing said film pair;

a first pair of confronting rollers forming an entry pair for driving a pair of contacting films entering said exposure station;

a second pair of confronting rollers forming a departure pair for driving a pair of contacting films leaving said exposure station; and means for driving said roller pairs and said pair of contacting films at the same tangential velocity;

said first and second roller pairs providing the sole support and guidance of said pair of contacting films between said roller pairs and through said exposure station.

2. The apparatus for making copies of developed X-ray films of claim 1 further comprising means for exposing said film pair passing through said exposure station to unrefracted light from a light source.

3. The apparatus for making copies of developed X-ray films of claim 2 wherein each of said roller pairs comprises a driven roller and an idler roller that is biased toward said driven roller.

4. The apparatus for making copies of developed X-ray films of claim 3 wherein one of said roller pair driven rollers is rotated by a drive motor and said apparatus further comprises a third idler roller biased into engagement with both roller pair driven rollers whereby the rotation of said one of said roller pair driven rollers is transmitted to the other of said roller pair driven rollers.

5. The apparatus for making copies of developed X-ray films of claim 4 wherein said roller pairs define a path for the pair of contacting films passing through said exposure station and the exposure station is defined by the unshadowed distance between the rollers of said roller pairs disposed on the side of the film pair path at which the light source is positioned.

6. The apparatus for making copies of developed X-ray films of claim 3 wherein the drive motor that rotates one of said roller pair driven rollers is a stepper motor and the duration of time the film pair is exposed to the light source is determined by the step rate of said stepper motor.

7. An apparatus for making copies of developed X-ray films by exposing a pair of contacting films including a developed X-ray film to be copied and an unexposed copy film comprising an exposure station including a light source for exposing said film pair;

a first pair of confronting rollers forming an entry pair for driving a pair of contacting films entering said exposure station;

a second pair of confronting rollers forming a departure pair for driving said film pair leaving said exposure station;

said two pairs of rollers determining the path of said film pair while such film pair is passing through said exposure station; and means for exposing said film pair passing through said exposure station to unrefracted light from said light source.

8. The apparatus for making copies of developed X-ray films of claim 7 further comprising means for driving said roller pairs at the same tangential velocity and wherein said first and second roller pairs provide the sole support and guidance of a pair of contacting films between said roller pairs and through said exposure station.

9. The apparatus for making copies of developed X-ray films of claim 8 wherein the means for driving said roller pairs is a stepper motor and the duration of time that the film pair is exposed to said light source is determined by the step rate of said stepper motor.

10. An apparatus for making copies of developed photographic films by exposing a film pair including an unexposed copy film in intimate contact with a developed film to be copied comprising a first pair of confronting rollers which are biased together for pressing a said film pair into intimate contact and advancing said film pair in unison;

an exposure station positioned subsequent to said first pair of confronting rollers;

a stepper motor connected to drive one of said first pair of rollers;

a second pair of confronting rollers at the exit from said exposure station which are drivingly connected to said one of said first pair of rollers such that said film pair passing between said first pair and said second pair of rollers is advanced in a planar relationship and at a constant average velocity through said exposure station; and control means connected to said stepper motor which controls the step rate of pulses delivered to said stepper motor and thereby controls the velocity at which said stepper motor causes said film pair to advance through said exposure station, said control means including a processor and a memory connected thereto that contains at least one sequence of velocity values and a control that can be set accurately and repetitively to a selected one of said sequence of values.

11. The copying apparatus of claim 10 wherein said memory contains a plurality of sequences of velocity values and said control means further includes switching means operable to select one of said plurality of said sequences of velocity values.

12. An apparatus for making copies of developed photographic films by exposing an unexposed copy film while in intimate contact with a developed photographic film original to form a film pair which are driven and exposed in unison comprising an exposure station;

transport means for moving said film pair in a planar orientation through said exposure station;

drive means connected to said transport means for driving said film pair at a predetermined average velocity through said exposure station;

said drive means including a pair of rolls including a drive roll and a pressure roll biased toward said drive roll, said pair of rolls being positioned at the entry to said exposure station;

said drive means further including a stepper motor connected to said drive roll and controller means which is settable to provide a stepper motor step rate that is a selected one of a predetermined sequence of step rate values to control the stepper motor speed and thereby the length of time the film is exposed at said exposure station; and an illumination source, disposed in said exposure station to direct light toward said film pair passing therethrough, comprising a fluorescent tubular element that issues emissions that are approximately matched to the wave length response of the unexposed copy film and that extends beyond the width of said exposure station at each end thereof, said tubular element extending sufficiently beyond the ends of said exposure station such that only the tube portion between the heating elements, at each end of the tube, confronts said exposure station.

* * * * *